US009820339B2

(12) United States Patent
Matsen et al.

(10) Patent No.: US 9,820,339 B2
(45) Date of Patent: Nov. 14, 2017

(54) INDUCTION HEATING USING INDUCTION COILS IN SERIES-PARALLEL CIRCUITS

(75) Inventors: Marc Rollo Matsen, Seattle, WA (US); William Preston Geren, Shoreline, WA (US); Robert James Miller, Fall City, WA (US); Mark Alan Negley, Bellevue, WA (US); William Chet Dykstra, Rockford, MI (US)

(73) Assignee: THE BOEING COMPANY, Chicago, IL (US)

(*) Notice: Subject to any disclaimer, the term of this patent is extended or adjusted under 35 U.S.C. 154(b) by 664 days.

(21) Appl. No.: 13/248,134

(22) Filed: Sep. 29, 2011

(65) Prior Publication Data

US 2013/0082047 A1  Apr. 4, 2013

(51) Int. Cl.
H05B 6/02 (2006.01)
H05B 6/10 (2006.01)
H05B 6/06 (2006.01)
B29C 35/08 (2006.01)

(52) U.S. Cl.
CPC ......... H05B 6/105 (2013.01); B29C 35/0805 (2013.01); H05B 6/06 (2013.01); B29C 2035/0811 (2013.01); H05B 2206/023 (2013.01)

(58) Field of Classification Search
CPC ... H05B 6/02; H05B 6/00; H05B 6/12; H05B 6/10; H05B 6/80; H05B 6/64
USPC ....... 219/600, 618, 620, 622, 624, 634, 633, 219/730, 642, 725, 728, 759, 635; 426/107, 108, 234
See application file for complete search history.

(56) References Cited

U.S. PATENT DOCUMENTS

| | | | |
|---|---|---|---|
| 3,599,078 A * | 8/1971 | Pelly | H02M 7/517 363/49 |
| 3,875,496 A * | 4/1975 | Carsten | 363/97 |
| 4,889,598 A | 12/1989 | Niskanen | |
| 5,442,156 A | 8/1995 | Westerman et al. | |
| 5,591,369 A | 1/1997 | Matsen et al. | |
| 5,645,309 A | 7/1997 | Graf | |
| 5,645,744 A | 7/1997 | Matsen et al. | |
| 5,728,309 A | 3/1998 | Matsen et al. | |
| 5,808,281 A | 9/1998 | Matsen et al. | |
| 5,833,795 A | 11/1998 | Smith et al. | |
| 5,916,469 A | 6/1999 | Scoles et al. | |
| 6,084,206 A | 7/2000 | Williamson et al. | |
| 6,114,050 A | 9/2000 | Westre et al. | |
| 6,528,771 B1 * | 3/2003 | Matsen et al. | 219/634 |
| 6,566,635 B1 | 5/2003 | Matsen et al. | |

(Continued)

FOREIGN PATENT DOCUMENTS

CN  1227701 A  9/1999
JP  2005158658 A  6/2005
(Continued)

OTHER PUBLICATIONS

U.S. Appl. No. 13/248,728, filed Sep. 29, 2011, Matsen et al.
(Continued)

*Primary Examiner* — Michael Laflame, Jr.
(74) *Attorney, Agent, or Firm* — Yee & Associates, P.C.

(57) ABSTRACT

A part is inductively heated by multiple, self-regulating induction coil circuits having susceptors, coupled together in parallel and in series with an AC power supply. Each of the circuits includes a tuning capacitor that tunes the circuit to resonate at the frequency of AC power supply.

13 Claims, 4 Drawing Sheets

(56) References Cited

U.S. PATENT DOCUMENTS

| | | | |
|---|---|---|---|
| 6,653,608 | B1 | 11/2003 | Matsen et al. |
| 6,884,975 | B2 | 4/2005 | Matsen et al. |
| 6,884,976 | B2 | 4/2005 | Matsen et al. |
| 6,897,419 | B1 | 5/2005 | Brown et al. |
| 6,914,225 | B2 | 7/2005 | Fischer et al. |
| 7,034,264 | B2 | 4/2006 | Kagan |
| 7,102,112 | B2 | 9/2006 | Anderson et al. |
| 7,358,467 | B2 * | 4/2008 | Yang et al. ............... 219/662 |
| 7,365,289 | B2 | 4/2008 | Wilkes et al. |
| 7,857,925 | B2 | 12/2010 | Keller et al. |
| 8,017,059 | B2 | 9/2011 | Matsen et al. |
| 8,330,086 | B2 | 12/2012 | Miller et al. |
| 2002/0020144 | A1 * | 2/2002 | Sarles et al. ............... 53/329 |
| 2004/0000782 | A1 | 1/2004 | Riefe |
| 2005/0035115 | A1 | 2/2005 | Anderson et al. |
| 2006/0027308 | A1 | 2/2006 | MacKenzie |
| 2008/0063025 | A1 * | 3/2008 | Fishman et al. ............ 373/144 |
| 2008/0128078 | A1 | 6/2008 | May et al. |
| 2009/0071217 | A1 | 3/2009 | Matsen et al. |
| 2010/0018271 | A1 * | 1/2010 | Matsen et al. ............... 72/19.1 |
| 2010/0108665 | A1 * | 5/2010 | Hirota ............... 219/600 |
| 2011/0139769 | A1 | 6/2011 | Miller et al. |
| 2012/0145702 | A1 | 6/2012 | Miller et al. |
| 2012/0145703 | A1 | 6/2012 | Matsen et al. |

FOREIGN PATENT DOCUMENTS

| | | |
|---|---|---|
| JP | 2011110719 A | 11/2009 |
| WO | WO2008021420 A1 | 2/2008 |
| WO | WO2010011847 A | 1/2010 |
| WO | WO2011075250 A1 | 6/2011 |
| WO | WO2012148592 A1 | 11/2012 |

OTHER PUBLICATIONS

PCT search report dated Feb. 15, 2011 regarding application PCT/US2010/056536, dated Nov. 12, 2010, applicant The Boeing Company, 10 pages.

PCT search report dated May 23, 2012 regarding application PCT/US2012/029705, dated Mar. 19, 2012, applicant The Boeing Company, 13 pages.

"Heat Blankets," Applied Heat, Inc., copyright 2009-2013, 1 page, accessed Apr. 12, 2013, http://www.appliedheat.com/blankets.htm.

"BriskHeat SR Silicone Rubber Composite Curing Heating Blankets," Brisk Heat, Inc., copyright 2009-2013, 2 pages, accessed Apr. 12, 2013, http://www.briskheat.com/p-355-sr-silicone-rubber-composite-curing-heating-blankets.aspx.

Office Action, dated May 14, 2012, regarding U.S. Appl. No. 12/638,960, 11 pages.

Notice of Allowance, dated Aug. 21, 2012, regarding U.S. Appl. No. 12/638,960, 11 pages.

Extended EP Search Report dated Oct. 22, 2013, regarding Application No. EP12186038.1, 6 pages.

International Preliminary Report on Patentability, dated Oct. 29, 2013, regarding Application No. PCT/US2012/029705, 9 pages.

Final Office action regarding U.S. Appl. No. 13/248,728, dated Apr. 16, 2015, 24 pages.

English Translation of State Intellectual Property Office of PRC Notification of First Office Action, dated Jun. 3, 2015, regarding Application No. 201210190783.5, 14 pages.

State Intellectual Property Office of China Second Notification of Office Action and English translation, regarding Application No. 201210375812.5, dated Jan. 20, 2016, 8 pages.

Notice of Allowance regarding U.S. Appl. No. 13/248,728, dated Oct. 8, 2015, 11 pages.

Office action regarding U.S. Appl. No. 13/248,728, dated May 15, 2014, 42 pages.

Japanese Notice of Rejection, dated Sep. 27, 2016, regarding Patent Application No. 2012-212389, 6 pages.

\* cited by examiner

INDUCTION HEATING USING INDUCTION COILS IN SERIES-PARALLEL CIRCUITS

STATEMENT REGARDING FEDERALLY SPONSORED RESEARCH OR DEVELOPMENT

This invention was made with Government support under contract number DE-FG36-08GO18135 awarded by the United States Department of Energy. The government has certain rights in this invention.

CROSS-REFERENCE TO RELATED APPLICATIONS

This application is related to U.S. patent application Ser. No. 13/248,728 filed concurrently herewith on Sep. 29, 2011, and entitled CURING COMPOSITES OUT-OF-AUTOCLAVE USING INDUCTION HEATING WITH SMART SUSCEPTORS.

BACKGROUND INFORMATION

1. Field

The present disclosure generally relates to induction heating techniques, and deals more particularly with a method and device for inductively heating relatively large areas using multiple induction heating coils with smart susceptors powered at relatively low voltages.

2. Background

Induction heating may be used in a wide variety of industrial processes to elevate the temperature of parts or structures. For example, in the field of composites, induction heating may be used to cure one or more portions of a structure formed from composite materials such as fiber reinforced polymer resins. In order to achieve thermal uniformity during the heating process, an induction heating system may use induction coils magnetically coupled with susceptors to translate electrical power into heat energy. The susceptors are sometimes referred to as "smart" susceptors because the materials from which they are formed are specifically chosen to produce a maximum, constant temperature when inductively heated. This equilibrium constant temperature is achieved at the Curie point of the susceptor material. The Curie Point is the temperature at which there is a transition between the ferromagnetic and nonmagnetic phases of the material. Once the Curie temperature is reached, the susceptors become non-magnetic and greatly reduce their heating rate. This built-in thermostatic control provides a means of avoiding overheating and allows precise temperature control. The susceptors may be in various physical forms, including but not limited to sleeves or spiral warps placed around induction coils, plates, or magnetic particles dispersed within a surrounding matrix.

Induction heating systems using smart susceptors of the type described above may be used, for example, as heating blankets to cure small areas of a composite, such as composite patches used to rework of an aircraft skin. However, this induction heating technique may not be practical where relatively large areas of a part or a structure need to be heated. For example, in order to cover larger part areas, multiple induction heating coils may be coupled together in series. Coupling the coils in series over large areas may have disadvantages in some applications, including the need to use relatively high drive voltages because of the cumulative resistance the coils present to the electrical power source. Also, series coupled coils may be more difficult to control, presenting the possibility of thermal runaway and/or uneven heating of the part.

Accordingly, there is a need for an induction heating device that provides uniform, controlled heating of large surface areas, using multiple self-balancing induction coil circuits. There is also a need for an induction heating method and device that uses relatively low voltages to drive multiple induction coils with smart susceptors covering relatively large surface areas.

SUMMARY

The disclosed embodiments provide a method and device for induction heating of relatively large surface areas using multiple induction coil circuits that are self-balancing to provide uniform, controllable heating. The induction coil circuits are coupled in parallel with each other, and in series with an AC power supply that drives the circuits at relatively low voltages and allows greater ease of system tuning. Thermal runaway caused by imbalances between the induction coil circuits is avoided by tuning the circuits with the capacitance needed to cause the circuits to resonate at the drive frequency of the AC power supply. The alternating current applied to each of the induction coil circuits is intrinsically regulated such that more energy is applied to those circuits whose susceptors are below their Curie temperature and less energy is applied to the circuits that have reached their Curie temperature. This enables the induction heating device to intrinsically regulate the current flow to rapidly achieve uniform temperatures at required processing temperatures. Additionally, the use of series-parallel induction coil circuits removes voltage-dictated size limitations to induction heating applications, while forcing thermal convergence over the entire area being heated.

According to one disclosed embodiment, an induction heating method comprises selecting at least two induction coil circuits each including an induction coil and a susceptor having a Curie temperature. The method further includes coupling the circuits in parallel with each other and in series with an AC power supply. The method also comprises shunting power away from one of the induction coil circuits to the other circuits when a susceptor in a circuit substantially reaches its Curie temperature. The method further comprises rebalancing the power applied by the AC power supply to the other induction coil circuits when power is shunned away from the circuit that has reached its Curie temperature. The rebalancing of the power may be performed by maintaining the power delivered to the other circuits substantially constant. Shunting power away from the circuit that has reached its Curie temperature may include detuning the circuit. The method may further include using capacitors to tune each of the circuits to renonate at the frequency of the AC power supply.

According to another disclosed method, heating a part comprises providing multiple induction coil heating circuits, wherein each of the circuits includes induction heating coil and a susceptor magnetically coupled with the coil and having a pre-selected Curie point. The method further comprises electrically coupling the heating circuits in parallel with each other and placing the heating coils in proximity with a part to be heated. The method also includes coupling an AC power supply in series with the parallel coupled heating circuits and using the AC power supply to supply alternating current to the circuits. The method further comprises tuning the resonant frequency of each of the heating circuits to substantially cancel the inductive reactance of the circuit. The tuning may be performed by using a capacitor.

According to still another embodiment, an induction heating device comprises an AC power supply, and a group of induction coil circuits each including a having a preselected Curie temperature. The induction coil circuits are electrically coupled in parallel with each other and in series with the AC power supply. Each of the induction coil circuits is tuned to the resonant frequency of the AC power supply.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
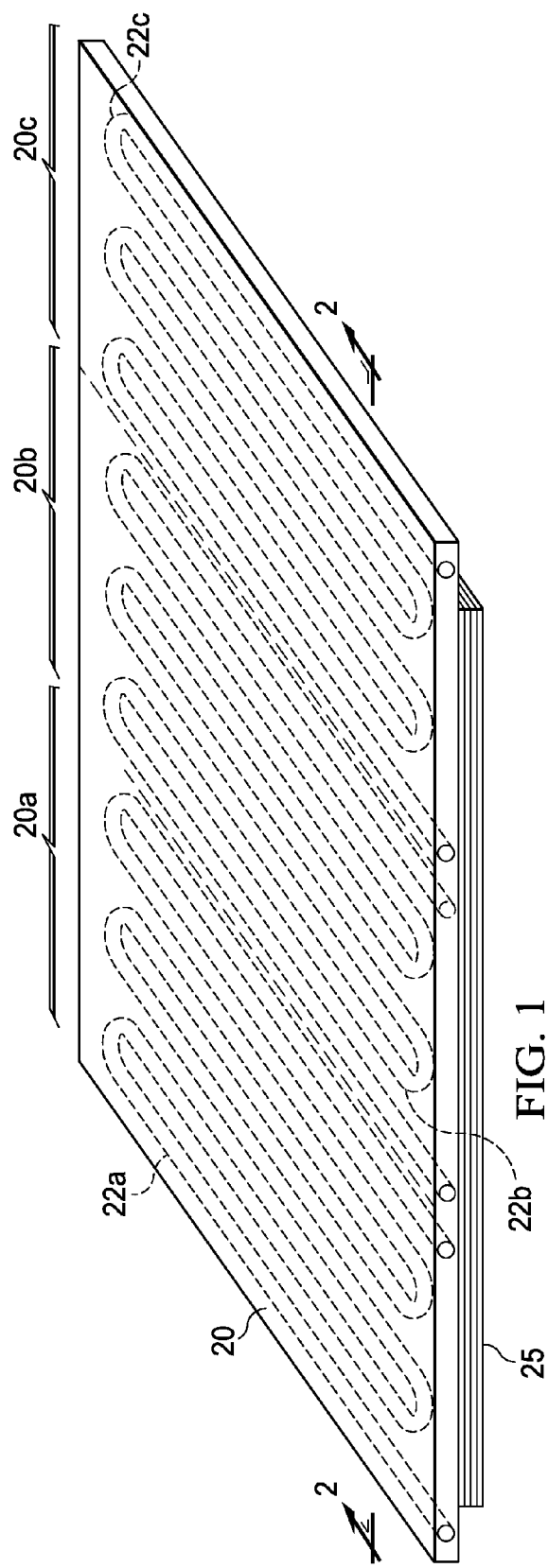
FIG. 1 is an illustration of a perspective view of an induction heating device employing multiple induction coils circuits to heat a part.

Referring first to FIG. 1, an induction heating device 20 includes a plurality of sections 20a, 20b, 20c each in contact with corresponding area of a part 25 to be heated. In the illustrated example, the part 25 comprises a laminated composite that is cured by the heat generated by the device 20. However, the composite laminate part 25 is merely illustrative of a wide range of parts, structures and surfaces whose temperature may be elevated using the heating device 20. Each section 20a-20c of the device 20 includes one or more corresponding, separate induction heating coils 22a, 22b, 22c. In the illustrated example, separate coils 22a-22c respectively cover sections 20a, 20b, 20c that are generally rectangular, however the sections 20a, 20b, 20c covered by the separate coils 22a-22c may have any shape, and may or may not be contiguous to each other, depending upon the areas of the part 25 to be heated. In the exemplary embodiment, coils 22a, 22b, 22c are arranged in a serpentine pattern, however other layout geometries are possible, depending upon the application. While three coils are employed in the example shown in FIG. 1, as few as two or more than three coils 22 may be used.

Figure 2:
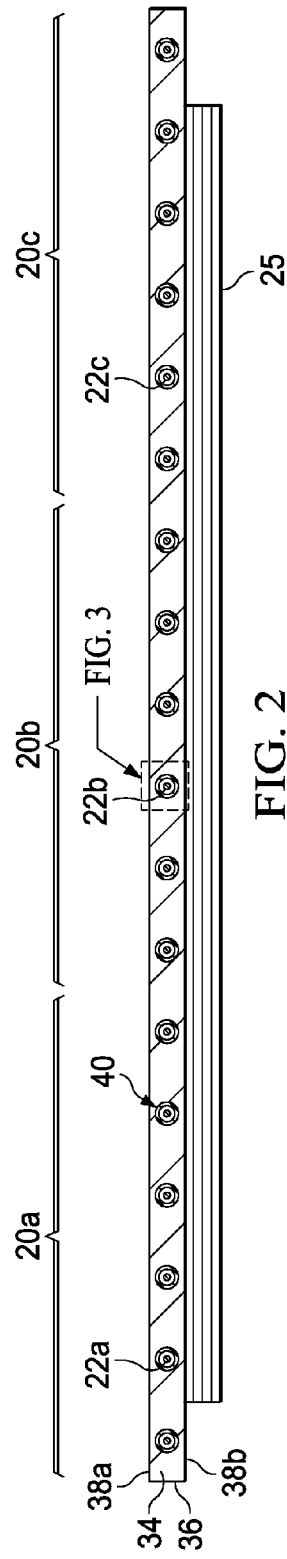
FIG. 2 is an illustration of a sectional view taken along the line 2-2 in FIG. 1.
Figure 3:
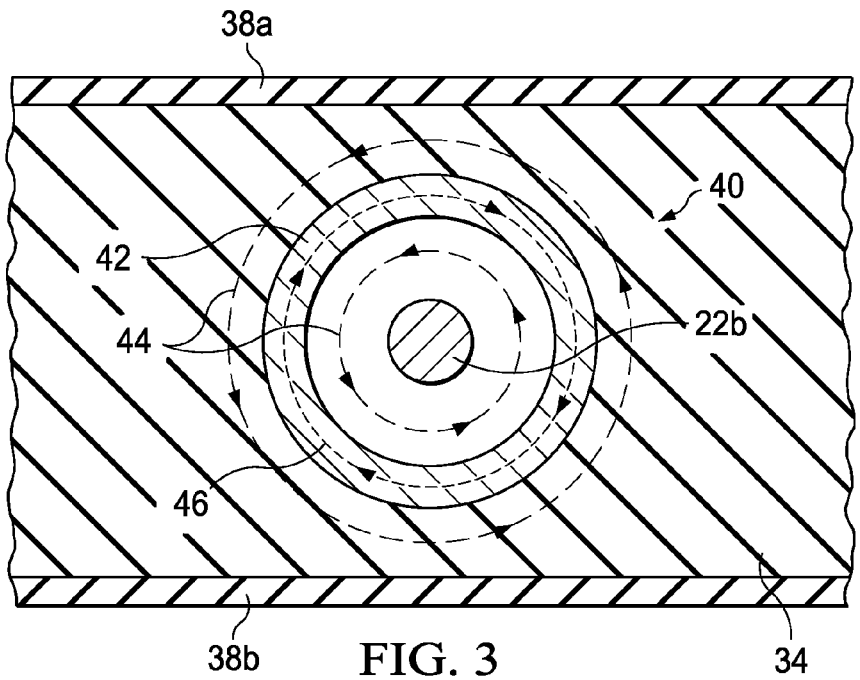
FIG. 3 is an illustration of the area designated as "FIG. 3" in FIG. 2.

Referring now also to FIGS. 2 and 3, the induction heating device 20 includes an outer housing 36 filled with a suitable matrix material 34 such as, without limitation, silicone, that is thermally conductive to facilitate thermal conduction of heat generated by a later discussed susceptor sleeve 40 to the surface of the device 20 in contact with the part 25. The matrix material 34 may or may not be flexible and/or resilient to allow the heating device 20 to conform to contours (not shown) on the part 25. The housing 36 may include upper and lower facesheets 38a, 38b formed from any suitable material, including but not limited to silicon, rubber, polyurethane, or other materials that provide the housing 36 with the required dimensional stability, which may or may not possess some degree of flexibility.

Each of the induction heating coils 22a, 22b, 22c comprises an electrical conductor surrounded by a concentric susceptor sleeve 40, sometimes also referred to herein as a susceptor 40, that is inductively heated by an alternating electrical current flowing through the associated coil 22a, 22b, 22c. The inductively heated susceptor sleeve 40 may be formed of a material having a high magnetic permeability, and functions to thermally conduct heat to the matrix 34 which in turn conducts heat to the part 25. The susceptor sleeve 40 may be continuous or discontinuous along a portion or the entire length of the associated coil 22a-22c and is formed of a magnetic material having a preselected Curie temperature that corresponds to the desired temperature to which the part 25 is to be heated. The susceptor sleeve 40 comprise a rigid cylinder or a braided material surrounding, but electrically insulated from its associated coil 22a-22c.

As best seen in FIG. 3, the flow of an alternating electrical current through the coil 22 produces an alternating magnetic field 44 around the coil 22a-22c. The magnetic field 44 is absorbed by the magnetic material from which the susceptor sleeve 40 is formed, causing the susceptor sleeve 40 to be inductively heated. The magnetic field 44 results in the generation of eddy currents 46 in the susceptor sleeve 40 due to its exposure to the magnetic field 96, causing resistive heating of the susceptor sleeve 40. Upon reaching the Curie temperature, the susceptor sleeve 40 becomes non-magnetic, at which point the magnetic field 44 is no longer concentrated in the susceptor sleeve 40. The induced eddy currents 46 and associated resistive heating of the sleeve 40 diminish to a level sufficient to maintain the temperature of the susceptor sleeve 40 at the Curie temperature.

As previously noted, the susceptor sleeve 40 may be formed from any of a variety of magnetic materials such as alloys that have Curie temperatures in the desired range which, in the case of a composite curing application, is within a range of temperatures that result in curing of the part 25. Alloys from which the susceptor sleeve 40 may be formed include but are not limited to alloys of copper, nickel, iron, cobalt as well as metal oxides including, without limitation, magnetite, maghemite and a variety of other oxides and metals.

While a susceptor in the form of a sleeve 40 has been described in connection with the illustrated embodiment discussed above, the induction heating device 20 may utilize other types of smart susceptors 40. For example, as disclosed in US Patent Application Publication 20110139769 published Jun. 16, 2011, which is incorporated herein by reference, the smart susceptor 40 may comprise particles (not shown) of a ferromagnetic or super paramagnetic material that are embedded in the matrix 34. Flow of AC current through the conductors 22 result in hysteretic heating of the ferromagnetic particles. This hysteretic heating of the embedded ferromagnetic particles in turn heats the matrix 34 by thermal conduction. Where the embedded particles are super paramagnetic, the matrix 34 is heated through relaxation heating of the super paramagnetic particles corresponding to a Curie temperature range that is related to the size or diameter of the particles. Other types of susceptors may be possible, including but not limited to plates, and spiral wraps (not shown) placed around the induction coils 22a-22b.

Figure 4:
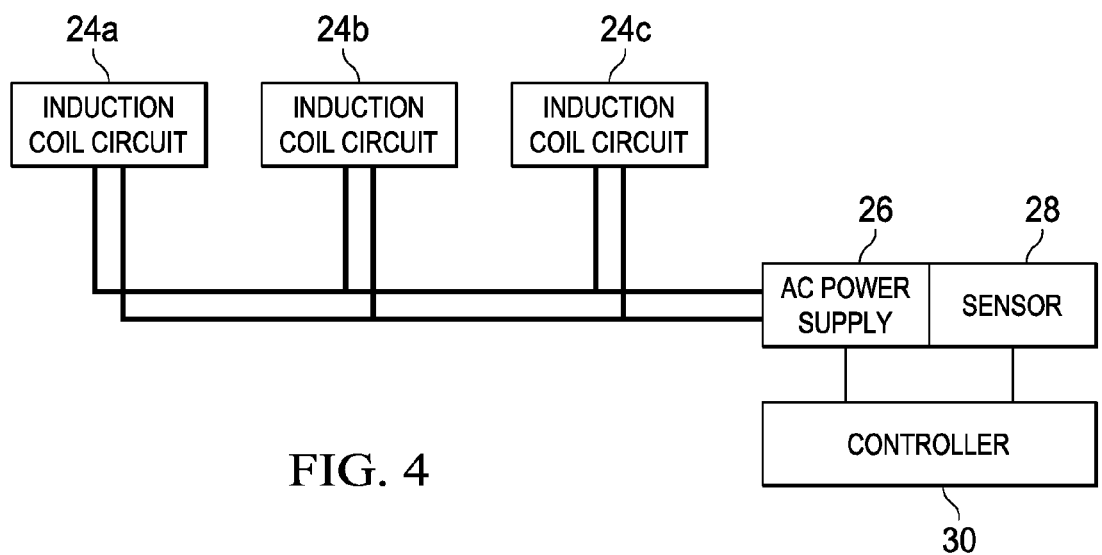
FIG. 4 is an illustration of a circuit block diagram of the induction heating device.

Referring now to FIG. 4, each of the induction heating coils 22a, 22b, 22c along with its associated susceptor (e.g. susceptor sleeve 40) forms a corresponding induction coil circuit 24a, 24b, 24c. In accordance with the disclosed embodiments, the induction coil circuits 24a-24c are electrically coupled in parallel relationship to each other, and in series with an AC power supply 26 which drives the induction coil circuits 24a-24c with alternating current. As previously noted, in the illustrated embodiment, three of the induction coil circuits 24a, 24b, 24c are shown coupled in parallel with each other, however, other embodiments may utilize more than three and as few as two of the circuits 24. The AC power supply 26 may be configured as a portable or fixed power supply 26, and is configured to supply alternating current at a frequency and voltage that is suitable for the application. For example and without limitation, the frequency of the supplied AC current may range from approximately 1 kHz to 300 kHz, but is preferably more than about 20 kHz in order to minimize unwanted inductive heating of materials such as graphite composites in the part 25.

The induction heating device 20 may include one or more sensors 28 which may comprise thermal sensors such as thermocouples for monitoring the heat at locations across the device 20. Alternatively, the sensor 28 may comprise a voltage sensor or other device coupled with the power supply 26 to indicate the voltage being applied to the induction coil circuits 24a-24c. A controller 30, which may comprise a programmed computer or a PLC (programmable logic controller) is coupled with the power supply 26 and the sensor 28, and is operative to adjust the applied alternating current over a predetermined range in order to adapt the device 20 to a wide variety of structures having different heating requirements. The controller 30 may further function to rebalance the alternating current supplied to the induction coil circuits 24a-24c as one or more of these circuits reaches its Curie temperature and ceases drawing current.

Where the sensors 28 are thermal sensors such as thermocouples, data from the thermocouples may be provided to the controller 30 in order to monitor the power supply 26 and/or regulate the magnitude or frequency of the supplied alternating current. As will be discussed later in more detail, the alternating current applied to each of the coils 22a-22c is intrinsically regulated such that more energy is applied to the coils 22 whose susceptors 40 are below the Curie point and less power is applied to the coils 22 whose susceptors 40 are above the Curie point. Power is shunted to the coils where the smart susceptor 40 is still magnetic and has not reached its Curie point. Essentially, the induction coil circuits 24a-24c are self-balancing to provide more uniform temperature distribution over the part 25 being heated.

Figure 5:
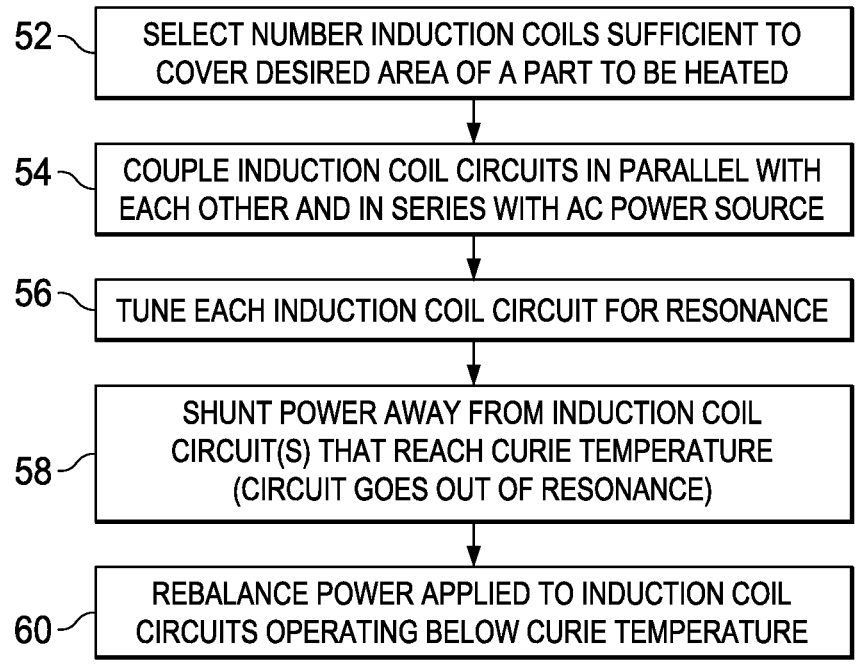
FIG. 5 is an illustration of a flow diagram of a method of induction heating using multiple induction coil circuits.

FIG. 5 illustrates the steps of a method of induction heating using multiple induction coils in combination with smart susceptors. Beginning at step 52, a number of induction coils 22a-22c is selected that is sufficient to collectively cover a desired area of a part 25 to be heated. At step 54, the induction coils 22a-22c are placed in circuits 24a-24c that are coupled in parallel with each other and in series with an AC power supply 26 that delivers an alternating current to each of the induction coil circuits 24a-24c. At step 56, each of the induction coil circuits 24a-24c is tuned and driven at a resonant frequency corresponding to the frequency of the alternating current. At step 58, when the susceptor 40 in an induction coil circuit 24a-24c reaches its Curie temperature, that induction coil circuit 24a-24c goes out of tune (i.e., out of resonance) and power is shunted away from that particular circuit to the remaining circuits 24a-24c. At step 60, the power being supplied to the heating device 20 by the AC power supply 26 is rebalanced to supply substantially equal amounts of power to those induction coil circuits 24a-24c that are operating below their Curie temperatures.

Figure 6:
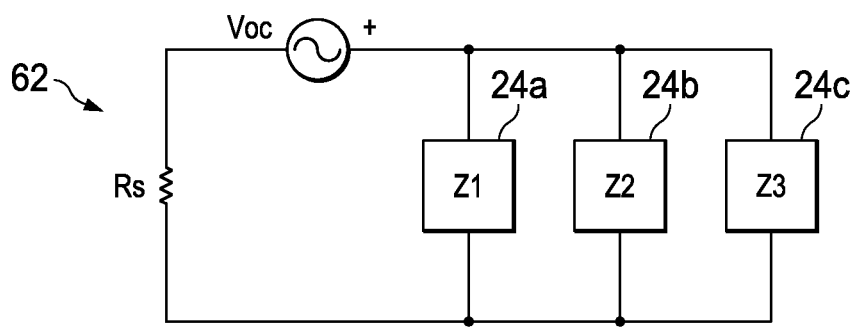
FIG. 6 is an illustration of an equivalent circuit diagram of the induction heating device.

FIG. 6 is an equivalent circuit corresponding to the series-parallel circuit arrangement in FIG. 4 in which each of the induction coil circuits 24a-24c may be represented as a corresponding impedance Z1, Z2 and Z3 which are coupled in parallel with each other, and in series with an AC voltage source Voc. From FIG. 6, it may be appreciated that since the induction heating device 20 is divided into separate coils 22a-22c that are coupled in parallel represented by impedances Z1, Z2, Z3, the voltage required to drive the heating deice 20 is reduced by number of the separate coils 22. The series circuit shown at 62 includes an inherent resistance Rs, and each of the impedances Z1-Z3 includes a resistance, and a reactance which inductive and capacitive components, as will be discussed below. When the susceptor 40 in one of the induction coil circuits 24, for example induction coil circuit 24b represented by impedance Z2, approaches its Curie point, then the permeability of the associated susceptor 40 diminishes substantially, causing a corresponding drop in resistive and inductive reactance components of the impedance Z2. Essentially, the coil 22b in circuit 24b becomes predominately non-magnetic and draws much less power than the other coils 22a, 22c because the coil 22b does not completely couple into the associated susceptor 40, and the power delivered to the coil 22b drops off. Provided that the decrease in resistance is approximately 90% or more, and the inductance decreases by about 50%, the induction coil circuit 24b will draw very little power while the other two circuits 24a, 24c will draw about half of the input power. To maintain a good match, the input circuit 62 may be retuned accordingly.

Figure 7:
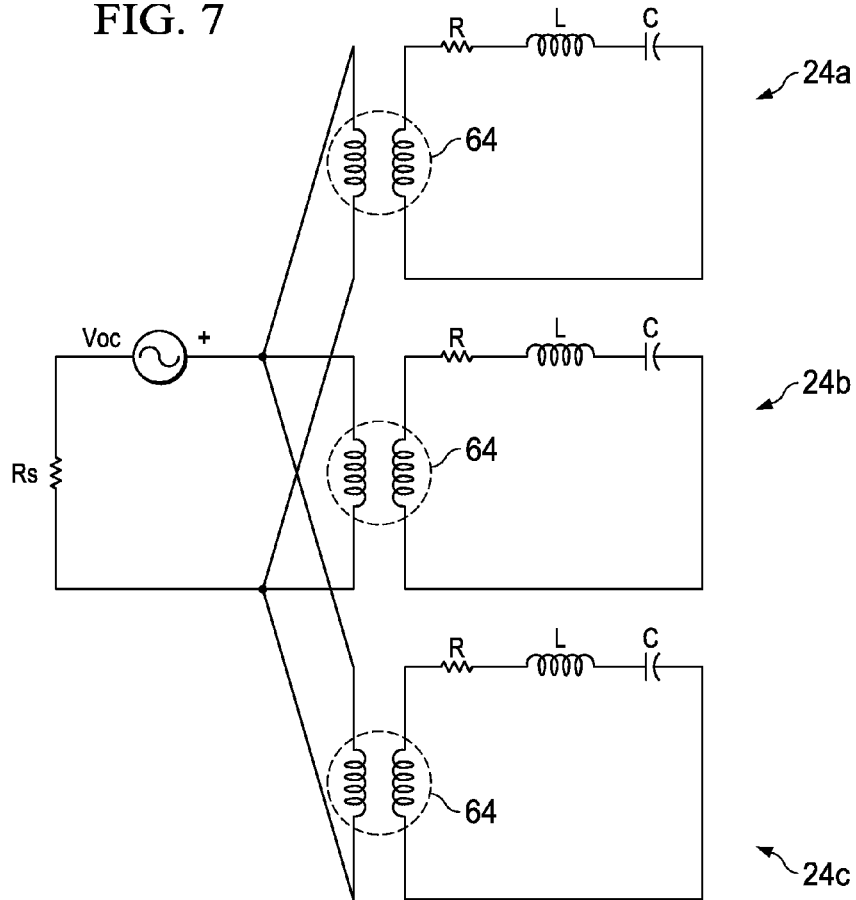
FIG. 7 is an illustration of a detailed schematic diagram of the induction heating device.

FIG. 7 illustrates additional details of each of the induction coil circuits 24a-24c respectively represented by the impedances Z1, Z2, Z3 in FIG. 6. Each of the circuits 24a-24c comprises an RLC circuit. R in each of the circuits 24a-24c represents the resistance of the induction coil 22 in addition to coupled resistance with its associated susceptor 40. The inductance L of the circuit 24a-24c is governed by the configuration of the coil 22, including its layout geometry, the number of turns of the coil 22 and the magnetic properties of the associated susceptor 40. A majority of the resistance R may be that of the susceptor 40 in the circuit 24a-24c. The capacitance C of the circuit 24a-24c is that of a tuning capacitor that tunes the circuit 24a-24c to resonate at the frequency of the applied alternating current. The particular value of the tuning capacitor C is selected such that it results in a capacitive reactance that substantially equals and cancels the inductive reactance of the circuit 24a-24c. This tuning minimizes the associated impedance Z1-Z3 of the circuit 24a-24c and results in maximum current flow through the circuit. The tuning capacitor C may be a discrete capacitor device or may be a distributed capacitance that is inherent in the overall design of the induction coil circuit 24a-24c.

The voltage that is required to drive each of the circuits 24a-24c is dependent on the impedances Z1, Z2, Z3 of the circuits and amount of current that is needed to drive the associated coils 22 (L), calculated according to Ohms Law. Thus, the power supply voltage output Voc should be selected to supply the needed drive voltage. In some embodiments, where the power supply voltage output Voc does not match the voltage needed to drive the circuits 24a-24c at the desired levels of current, transformers 64 may be used to respectively transform the output voltage Voc to the needed voltage level.

As previously mentioned, the induction coil circuits 24a-24c are self-balancing. The input impedance Z of a coil 22 exciting a smart susceptor 40 has a relatively large reactance which must be matched with the narrow band, tuned AC power supply Voc. As a susceptor heats up, both inductance L and resistance R change appreciably, requiring real time adjustment of the AC power supply Voc. In the vicinity of the Curie temperature, both the inductance L and the resistance R drop dramatically. If two or more induction coil circuits are appropriately coupled in parallel with each other and in series with the AC power supply Voc as previously described, it is possible to exploit this sharp impedance reduction to shunt power from the Curie state susceptor 40 which is already sufficiently heated. The tuning capacitor C tunes the coil 22 to match the power supply input resistance, and cancels the inductive reactance, while a transformer (not shown) may be used to scale the remaining resistance to match the power supply input.

When a smart susceptor 40 in one of the induction coil circuits 24a-24c reaches its Curie temperature and becomes non-magnetic, then the associated induction coil circuit 24a-24c goes out of tune with the resonant drive frequency due to the change of inductance and essentially blocks current from flowing through the unloaded (non-magnetic coil) circuit 24a-24c. It should be noted here that although the resistance drops substantially which would ordinarily result in higher current flow through a circuit that has reached its Curie temperature, the fact that value of the capacitor C does not appreciably change results in detuning of the circuit 22a-22c which substantially prevents current flow to the circuit 22a-22c.

Figure 8:
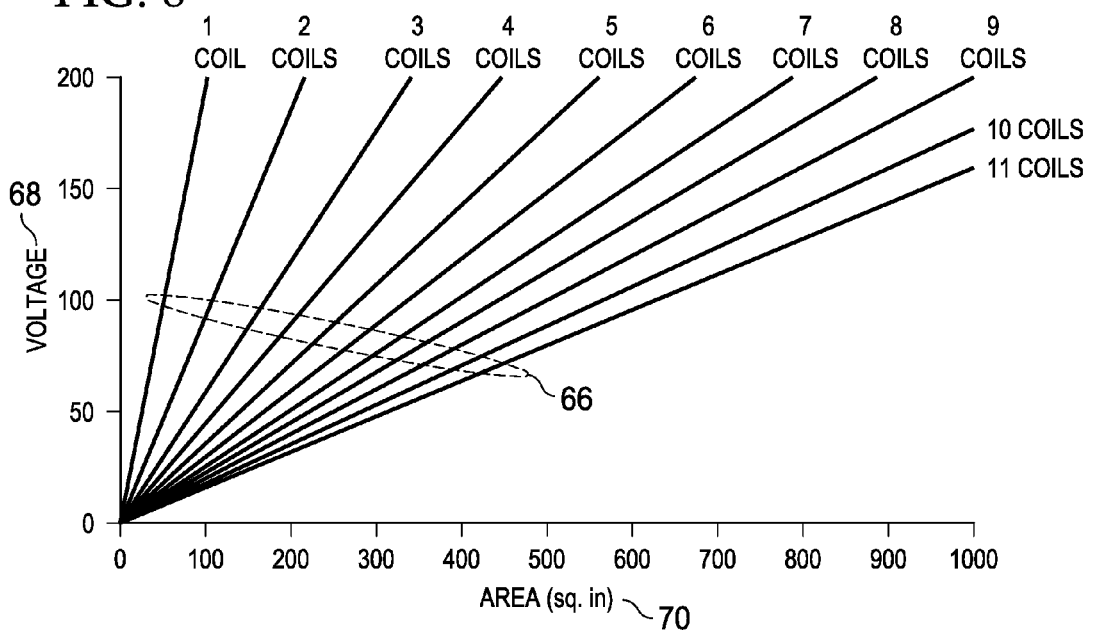
FIG. 8 is an illustration of a graph showing the number of coils required to cover various surface areas when driven at preselected voltages.

FIG. 8 is a graph showing the relationship between the applied voltage 68 and the area being heated 70 when multiple induction coils 22 are placed in parallel with each other and in series with the applied voltage 68. The example shown in the graph of FIG. 8 is for a drive frequency of 250 kHz. As can be seen from the plots 66, at a given level of applied voltage 68, larger areas 70 of a part 25 may be heated by using heating circuit that is divided into a larger number of coils coupled in parallel with each other, and in series with the applied voltage 68.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An induction heating method, comprising:
   selecting at least two induction coil circuits each including a susceptor having a Curie temperature;
   coupling the induction coil circuits in parallel with each other and each of the induction coil circuits in series with an AC power supply;
   tuning a resonant frequency of each of the induction coil circuits to match a frequency of the AC power supply;
   determining by a processor a power level provided to each induction coil circuits;
   shunting power away from one of the induction coil circuits to the other induction coil circuits, by detuning the circuit, when the susceptor of the one circuit substantially reaches its Curie temperature; and
   rebalancing with a controller the power applied by the AC power supply to the other induction coil circuits when power is shunted away from the circuit that has reached its Curie temperature, the power delivered to the other induction coil circuits during rebalancing being substantially equal.

2. The method of claim 1, further comprising:
   tuning each of the induction coil circuits to substantially match the input resistance of the AC power supply and cancel the inductive reactance of the circuit, the tuning performed by adjusting a tuning capacitor.

3. The method of claim 2, wherein the tuning includes using a transformer to scale the resistance of one of the induction coil circuits that has reached its Curie point to substantially match the resistance of the AC power supply.

4. A method of heating a part, comprising:
   providing multiple induction coil heating circuits, each of the circuits including an induction heating coil and a susceptor wherein the susceptor is magnetically coupled with the coil and has a preselected Curie point;
   electrically coupling the circuits in parallel with each other;
   placing the induction heating coils in proximity with the part;
   coupling an AC power supply in series with each of the circuits;
   using the AC power supply an alternating current the circuits;
   tuning the resonant frequency of each of the circuits to substantially cancel the inductive reactance of the circuit;
   shunting power away from one of the induction coil heating circuits to the other induction coil heating circuits, by detuning the circuit, when the susceptor of the one circuit substantially reaches its Curie temperature;
   rebalancing with a controller the power applied by the AC power supply to the induction coil heating circuits when the susceptor in at least one of the circuits reaches its Curie temperature, the power delivered to the other induction coil heating circuits devices during rebalancing being substantially equal.

5. The method of claim 4, wherein the tuning is performed using a capacitor having a value that substantially cancels the inductive reactance of the circuit substantially at the Curie point.

6. The method of claim 4, wherein the tuning is performed using a transformer to scale the resistance of each of the circuits to match the AC power supply and a tunable capacitor.

7. An induction heating device, comprising:

an AC power supply;

a group of induction coil circuits each including an induction heating coil and a susceptor having a preselected Curie temperature;

wherein the induction coil circuits are coupled in parallel with each other and each of the induction coil circuits is in series with the AC power supply, the group of induction coil circuits tuned with the AC power supply to shunt power away from one of the induction coil heating circuits, by detuning the circuit, to at least one other induction coil heating circuit when the susceptor of the one circuit substantially reaches its Curie temperature; and a controller controlling the power supply to the induction coil circuits, shunting power away from the induction coil circuits whose susceptors have reached the Curie temperature to the other circuits, and the power delivered to the other circuits during rebalancing being substantially equal.

8. The induction heating device of claim 7, wherein each of the induction coil circuits is tuned to match the input resistance of the AC power supply.

9. The induction heating device of claim 7, wherein each of the induction coil circuits is tuned to resonate at the frequency of current supplied by the AC power supply.

10. The induction heating device of claim 7, wherein each of the induction coil circuit includes a capacitor providing the circuit with a value of capacitance reactance that is substantially equal to the inductive reactance of the circuit when the susceptor is below its Curie temperature.

11. The induction heating device of claim 10, wherein the capacitor is a discrete capacitor.

12. The induction heating device of claim 10, wherein the capacitor is formed by capacitance that is distributed within the circuit.

13. The induction heating device of claim 7, further comprising: a thermally conductive matrix in which the induction coils and the susceptors are embedded.

* * * * *